May 24, 1949.　　　　　N. STEVENS　　　　　2,471,359
TIRE CASING REPAIR DEVICE
Filed Jan. 30, 1946　　　　　　　　　　　　　　2 Sheets-Sheet 2
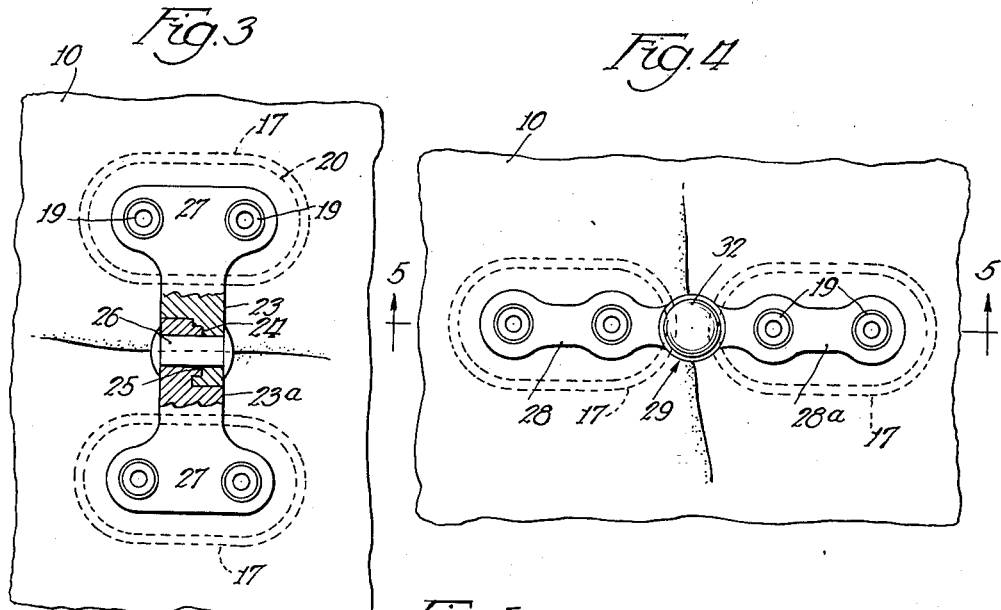
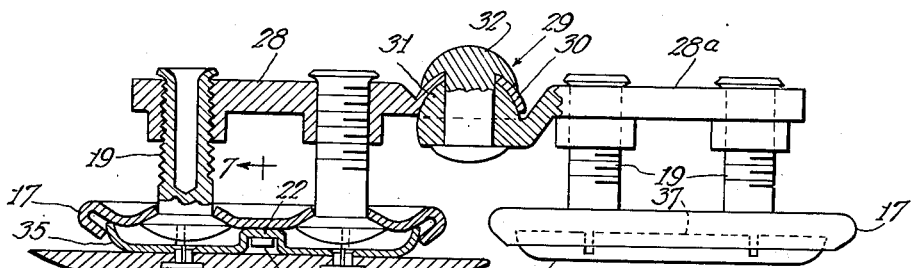
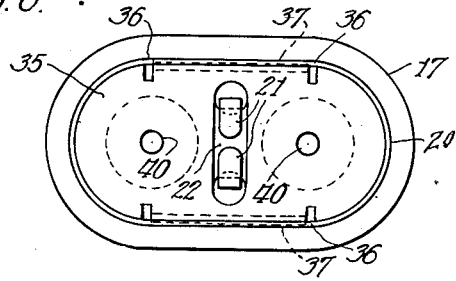
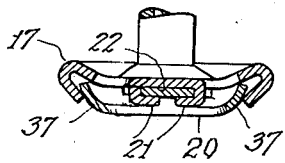
Inventor.
Nichols Stevens
By Charles A. Shersey
Atty Patented May 24, 1949

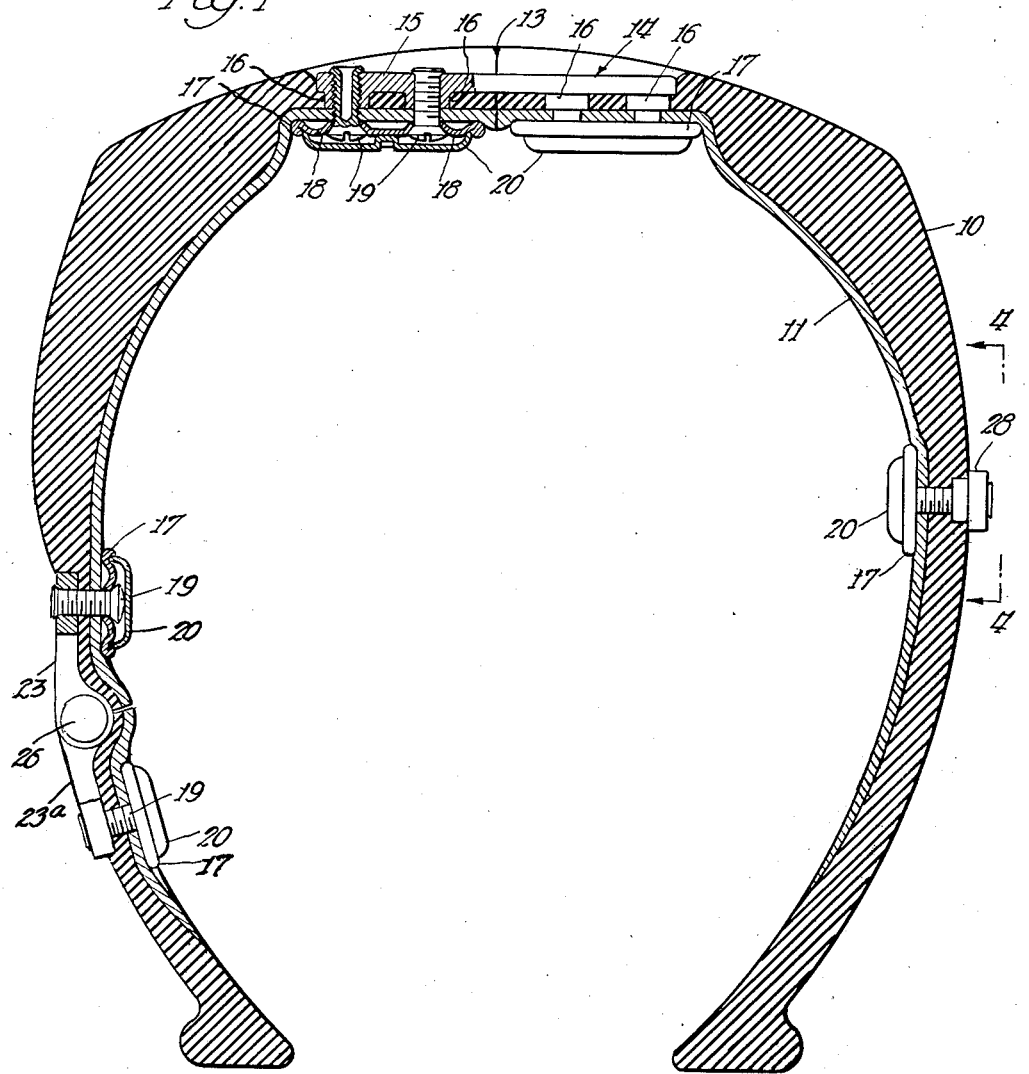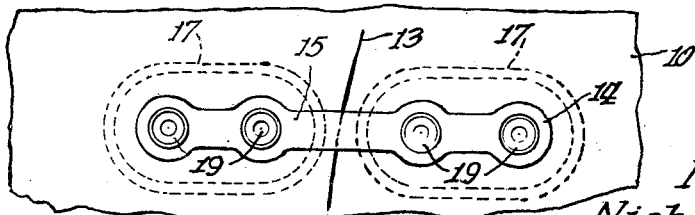

2,471,359

UNITED STATES PATENT OFFICE 2,471,359

TIRE CASING REPAIR DEVICE

Nichols Stevens, Chicago, Ill.

Application January 30, 1946, Serial No. 644,342

3 Claims. (Cl. 152—369)

This invention relates to a tire casing repair device and its principal object is to provide simple and effective means to secure together the cut edges of a tire casing which has become cut or torn open.

Another object is to provide a link, either solid or hinged for straddling the cut, in connection with washers and screws for clamping the link on the casing.

Another object is to provide a repair device for use, either on the tread of the casing or on the side walls thereof, whether the cut extends along the casing or cross-wise thereof.

With these and other objects and advantages in view, this invention consists in the several novel features hereinafter fully described and more particularly defined in the appended claims.

The invention is clearly illustrated in the accompanying drawings, in which:

Fig. 1 is a cross section through a tire casing showing several of the repair devices applied thereto;

Fig. 2 is a plan of a fragment of the tire casing showing one of the repair devices applied to the tread portion thereof;

Fig. 3 is a fragmental side elevation of the tire casing showing the form of repair device seen at the left hand side in Fig. 1;

Fig. 4 is a fragmental side elevation of the tire casing showing the form of repair device seen at the right hand side of Fig. 1;

Fig. 5 is a detail horizontal section taken on the line 5—5 of Fig. 4;

Fig. 6 is a side elevation of one of the washers seen in Fig. 5;

Fig. 7 is a vertical cross section taken on the line 7—7 of Fig. 5, and

Fig. 8 is a detail view partly in section and partly in elevation of a screw used in the repair device and an associated guide pin.

Referring to said drawings, and first to Fig. 1, the reference character 10 designates a tire casing of conventional form. On the inner side of the tire casing is an inner-liner or a shoe 11. The tread of this tire casing has a cut 13 therein, the edges of which are tied together by one or more of the repair devices 14, depending on the length of the cut.

This form of the repair device comprises a link 15, formed with two or more internally screw threaded bosses 16, projecting from one side thereof. The link 15 is placed on the external face of the tread cross-wise of the cut.

On the internal face of the tire casing are placed two oval washers 17, which are formed with curled edges to prevent chafing the tire casing. Each washer is formed with screw holes that are adapted to register with the bosses on the link, and the metal of the washer around the screw hole is tapered toward the screw hole as at 18, to receive the tapered head of a hollow screw 19, which is screwed into a boss in the link 15.

The screws are screwed up tightly thereby compressing the tire casing between the link and washers and effectively tying the two edges of the cut together. To protect the inner tube from injury by the washers or screws, oval caps 20 are attached to the washers with their margins engaging the washers at the curled edges thereof. The caps may be attached to the washers as by tongues 21 (see Figs. 6 and 7) struck up from the metal of the washers and engaging over depressed portion 22 of the caps. Initially the tongues extend at right angles to the body of a washer and are bent over the depressed portion 22 of the cap after the latter has been placed on the washer.

To enable the link to flex or yield when applied to a side wall of a tire casing as shown at the left hand side of Fig. 1 when the cut extends along the length of the casing wall, the link is composed of two hinged together link members 23, 23a, placed cross-wise of the cut. One of the link members is provided at the hinge joint with a hollow annular flange 24 which fits in an annular groove 25, formed in the other link member. The two link members are hingely connected together by a headed pin 26. In this form of link the ends thereof may be of T-formation as shown at 27. Washers 17, screws 19 and caps 20 are provided as in the form of the invention described in connection with the tread repair device.

In case the cut on a side wall of a tire casing extends cross-wise thereof, as shown in Fig. 4, the link members 28, 28a may have a ball and socket hinge connection 29 between them (see also Fig. 5). The link member 28 is formed with a socket 30 and the link member 28a is formed with a ball member 31 which fits in the socket. A headed rivet 32 extends through the ball and socket joint and secures the two link members together. This form of the repair device is provided with the washers 17, screws 19 and caps 20 as in the other forms of the invention.

The screws are preferably made hollow and pointed as seen in Fig. 8, and a pointed guide pin 32 is provided for guiding the screws through the tire casing. The pin is pointed and in applying the device to a tire casing, the pin is driven through the casing from the outside thereof, at places registering with the screw holes in the link. The open end of the screw is then placed over the pointed end of the pin, pushed through the fabric side of the tire casing and is thereby guided to the threaded boss of the link and screwed into it. When the link and washers have been tightly clamped upon the casing, the protruding end of the hollow screws are cut off and the ends thereof may be pinned over the link as seen in Fig. 1 to prevent any possibility of the screws from unscrewing.

In Figs. 5, 6 and 7 is shown an additional improvement for attaching the caps to the washers and for additionally protecting the inner tube from injury by the caps or washers. The curled edge of the washer is an open curled edge, and the cap is in the form of a shallow bowl. Its rim 35 is slit as at 36 to leave resilient tongues 37, the edges of which are spread apart far enough to engage the inner faces of the open curled edges of the washer as seen in Fig. 7.

A rubber or other pliable pad 38 may be used with the cap to protect the inner tube. Headed split rivets 39 are used to attach the pad to the cap. The heads of the rivets are embedded in the pads and their split shanks are formed with flaring heads that engage in flaring holes 40 in the cap.

After the cap has been attached to the washer, the split shanks of the rivets are forced through the holes, the furcations of the shanks yielding toward each other and then snapping back against the edges of the holes. The cap may be used with or without the pad.

The caps serve another useful function. In the event that one of the screws becomes broken, or unscrewed from the washer, the cap prevents the screw from dropping between the casing and inner tube. If a screw became lodged between the casing and inner tube it would chafe both the casing and tube and would soon puncture the tube.

From the above it is apparent that I have provided a repair device which effectively ties the edges of a cut tire casing together and eliminates the necessity of vulcanizing the casing at the cut place. The repair can be made at the place where the cut takes place, thereby making it unnecessary to tow the vehicle to a repair shop.

What I claim as new and desire to secure by Letters Patent is:

1. A tire casing repair device comprising in combination a link composed of two hinged together link members adapted to be placed on the external side of a tire casing across a cut therein, washers, one adapted to be placed on the internal side of the casing on each side of the cut, said washers having resilient tongues screws connecting the washers and link, whereby to tie the two edges of the cut together, and caps having flaring side edge portions secured under the curled edges of said washers.

2. A tire casing repair device comprising in combination a link adapted to be placed on the external side of a tire casing across a cut therein, dished washers, one adapted to be placed on the internal side of the casing on each side of the cut with the hollow side against the casing, screws connecting the washers and link, whereby to tie the two edges of the cut together, and caps for protecting an inner tube against injury by the washers and screws, said caps having depressed portions with holes at the ends of the depressed portions, and said washers having tongues extending through said holes and engaging over depressed portions of the caps for securing the caps to the washers.

3. In a repair device for tire casings, a washer arranged to be placed on the inner face of a tire casing, means to clamp the washer on the tire casing, said washer having a curled edge, a cap having resilient rims engaging the inner sides of the open curled edges, and a pliable pad, having split rivets formed with flaring heads seating in holes formed in the washer.

NICHOLS STEVENS.

REFERENCES CITED

The following references are of record in the file of this patent:

UNITED STATES PATENTS

| Number | Name | Date |
| --- | --- | --- |
| 180,748 | Bray | Aug. 8, 1876 |
| 321,691 | Comstick | July 7, 1885 |
| 578,433 | Wehl | Mar. 9, 1897 |
| 1,174,909 | Stuart | Mar. 7, 1916 |
| 1,221,912 | Sampson | Apr. 10, 1917 |
| 1,300,769 | Pirtle | Apr. 15, 1919 |
| 2,353,851 | Rosan | July 18, 1944 |